United States Patent [19]

Edelbach

[11] 4,193,522
[45] Mar. 18, 1980

[54] DISPENSING MACHINE MIXING DEVICE AND HOUSING THEREFOR

[75] Inventor: Loren C. Edelbach, Maple Grove, Minn.

[73] Assignee: The Cornelius Company, Anoka, Minn.

[21] Appl. No.: 928,761

[22] Filed: Jul. 27, 1978

[51] Int. Cl.² ............................................. B67D 5/60
[52] U.S. Cl. ................................... 222/145; 222/190; 222/240; 222/242; 222/412; 222/564; 366/157; 366/165; 415/143
[58] Field of Search ............... 222/129.1, 135, 145, 222/236, 239–242, 411, 412, 413, 575, 547, 564, 140, 372, 376; 366/155, 156, 157, 165, 181, 196, 315; 415/143, 204, 206, 219 C

[56] References Cited

U.S. PATENT DOCUMENTS

| | | | |
|---|---|---|---|
| 2,528,094 | 10/1950 | Walker | 366/165 |
| 2,688,470 | 9/1954 | Marco | 366/155 |
| 2,823,868 | 2/1958 | Scherer | 366/315 X |
| 3,437,244 | 4/1969 | Alvarez et al. | 222/240 |
| 3,682,447 | 8/1972 | Zucker et al. | 366/157 |
| 3,995,838 | 12/1976 | Zucker | 366/165 X |

Primary Examiner—Robert J. Spar
Assistant Examiner—Fred A. Silverberg
Attorney, Agent, or Firm—Henry C. Kovar

[57] ABSTRACT

A dispensing machine mixing device has a base fastenable to the chassis of a dispensing machine, a bearing in the base, a shaft rotatably mounted in the bearing, a shaft seal on the front of the base, a mixing impeller on the front of the shaft and to the front of the seal, and a reduced size housing secured to the base; the housing has an integral tubular wall holding the seal to the base and defining the circumference of a mixing chamber within which is the impeller, a front end wall, a mixed fluid outlet from the bottom of and to the front of the mixing chamber, a fluid inlet conduit generally on the axis of rotation of the impeller, and a funnel to the front of the mixing chamber and above the inlet conduit; a common wall portion forms part of both the funnel and the mixing chamber wall, and part of a lower funnel wall forms part of the inlet conduit and is exposed to the mixing chamber; the inlet conduit to the mixing chamber expands in cross-section toward the mixing chamber.

20 Claims, 4 Drawing Figures

DISPENSING MACHINE MIXING DEVICE AND HOUSING THEREFOR

BACKGROUND OF THE INVENTION

1. Field of the Invention

This invention pertains to a mixing device for mixing a food or beverage concentrate and diluent together, and to a housing for such a mixing device.

2. Prior Art

The prior mixing devices of this type have required a considerable amount of height. A specific prior device was 5.2 inches (132 mm) high. The total height of a dispensing machine is a directly proportional function of the height of the mixing device. For example, a dispensing machine must have height sufficient for insertion of a cup under the mixing device, for the mixing device, and for powder canisters to feed concentrate into the mixing device. The taller the mixing device, the taller the dispensing machine and the shorter the mixing device, the shorter the dispensing machine.

The materials required and cost of structure and cabinetry are influenced by the total height of the dispensing machine and therefor can be and are influenced by the height of the mixing device.

The prior mixing devices have been rather high speed, for example they have operated in the range of 11,000 to 14,000 RPM. Consequently, these mixers have a high frequency whine, and make a considerable amount of air noise from the whirling impeller and from spattering of diluent hit and slung at high speeds by the impeller.

The prior mixing devices have also had short seal life and seal burn out problems. Replacement of seals has been a problem as a mixer base usually has required removal from the dispenser in order to replace a seal. Failure of a shaft seal has usually destroyed the drive motor as mixing impellers have been mounted directly on the drive motor shaft and leakage past the seal has gone into the motor.

Sanitation has been a problem with the prior mixing devices for several reasons. Firstly the shaft seal has not been removable and washable save for complete replacement. The impeller drive shaft was not cleanable at the area of the shaft seal. The prior mixing devices also have a tendency to blow powdered concentrate around the inside of the dispensing machine. The prior mixing devices tend to indiscretely and randomly blow air out of either the inlet or outlet; typically both the inlet and outlet to the mixing impeller have been radial apertures and air flow could go either way when the impeller was rotating. When air is blown out of the inlet, powder is blown away from the inlet and then subsequently settles like dust on the interior of the dispenser.

Reverse flow of air has another adverse side effect, specifically steam from hot diluent water is blown back around the powder concentrate canister. Concentrate powders are hydroscopic and tend to cake up and plug the powder dispenser, tend to cake up and drop off in chunks giving an erratic concentrate to water mixture and giving chunks of concentrate in the finished beverage or food, and are very unsightly.

Elaborate structures have been devised to protect the powder canister from steam and airflow. Some of these structures are baffles, positive ventilation fans, and hot air pipes. It will be appreciated both the fans and hot air pipes require electrical energy consumption.

Upward flow of steam from the prior mixing devices immediately after a dispensing cycle has been a problem for at least two reasons. Firstly the prior mixing devices have not drained hot water fast enough or well enough and residual hot water in the mixing devices would tend to steam off and go upward. Secondly, the remaining hot water and heat in the mixing device tends to effect upward rising of the steam in a reverse flow when the mixing device is turned off. The prior art mixing devices have had little or no resistance to reverse air flow, specifically upward air flow.

OBJECTS OF THE PRESENT INVENTION

It is an object of the present invention to provide a mixing device of materially reduced height.

It is an object of the present invention to provide a mixing device which is operable at materially reduced speeds.

It is an object of the present invention to provide a mixing device which is significantly quieter than the prior art.

It is an object of the present invention to provide an improved mixing device and a housing therefor having a faster, more thorough and more positive mixing with a reduced physical size and with greater flow capacity.

It is an object of the present invention to provide a mixing device which has an easily replaceable shaft seal.

It is an object of the present invention to provide a mixing device which is more sanitary.

It is an object of the present invention to provide a mixing device which provides for positive downward air flow.

It is an object of the present invention to provide a mixing device which provides resistance to upward air flow through itself.

It is an object of the present invention to provide a mixing device which has improved water drainage.

It is an object of the present invention to provide an improved bearing and seal construction for a mixing device.

It is an object of the present invention to provide a housing for improving the air flow, noise level, water drainage and lowering the height of a mixing device.

SUMMARY OF THE INVENTION

In accordance with the principles of the present invention, a mixing device having a mixing chamber and inlet thereto, has the discrete novel structuures of a common wall portion forming both of a part funnel wall and a part of a mixing chamber wall, an ingredient inlet to the mixing chamber which expands in cross-section towards the mixing chamber, an ingredient inlet which is directly above and empties into a fluid outlet, a mixing impeller having a helical feed auger, an improved base and shaft and shaft retainer and seal construction, and a mixer housing having the common wall portion and the expanding ingredient inlet as integral portions thereof.

ON THE DRAWINGS

AS SHOWN ON THE DRAWINGS

Figure 1:
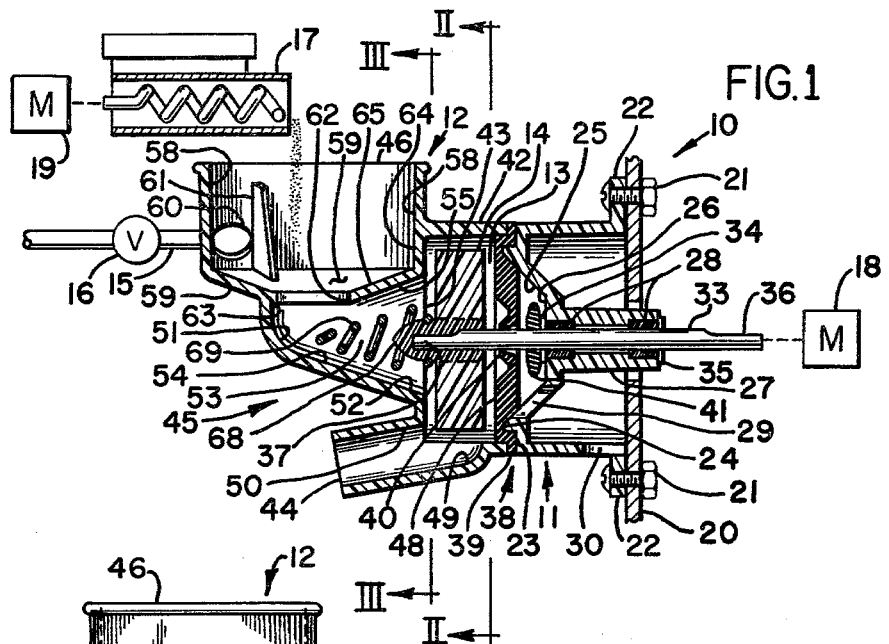
FIG. 1 is an elevational cross-sectional view of the preferred embodiment of a mixing device and a housing therefore provided in accordance with the principles of the present invention.

The principles of the present invention are particularly useful when embodied in a mixing device of the type illustrated in FIG. 1 and generally indicated by the numeral 10.

The mixing device 10, hereinafter referred to as "mixer," includes a base 11, a housing 12 secured to the base 11 and defining together with the base 11 a mixing chamber 13, hereinafter referred to as the "chamber." Within the chamber 13 is a rotary mixing impeller 14, hereinafter referred to as the "impeller" for effecting turbulent mixing motion of any concentrate and/or diluent ingredients within the chamber 13.

The mixer 10 receives liquid diluent from a fluid line 15 having a normally closed solenoid valve 16. Concentrate in powder form is provided by a powder dispenser 17 or other means above the mixer 10. Electric motors 18, 19 are connected to power and drive the mixer 10 and powder dispenser 17 respectively. The liquid solenoid valve 16 and motors 18, 19 are operatively interconnected for concurrent operation by an electric switch (not shown) which may be under control of a timer and/or a coin device (not shown).

A specific diluent is hot water, supplied to the mixer 10 at a temperature of about 90° C. (195° F.). Specific examples of concentrates are powdered chocolate, powdered or flaked mash potato mix, powdered french fry potato mix, powdered gravy concentrate, powdered cheese concentrate and dehydrated grits. Liquid chocolate concentrate may also be provided for dilution with hot water. Another diluent is cold water and concentrates for dilution by cold water including powdered or liquid real or formulated fruit beverage concentrates, and dairy base concentrates such as milkshake mix. New and improved beverage and food concentrates are continually being introduced by food manufacturers, and the foregoing examples are for purpose of illustration and are not all inclusive of the many beverage, food, and other humanly consumable concentrates with which the present mixer 10 is operative a nd most useful.

The mixer base 11 is rigidly fastened to a dispensing machine chassis member 20 by conventional fasteners 21 through base lugs 22. An annular shoulder 23 and a projecting annular rib 24 form the front side of the base 11. A concave frusto-conical depression section 25 extends rearwardly of the shoulder 23 and rib 24 and into the base 11. From an interior flat bottom 26 of the depression section 25, there extends rearwardly a centrally positioned bearing housing 27 within which there is a bearing 28. At the bottom of the depression section 25 there is a drain aperture 29 and at the bottom of the base 11 there is a further drain aperture 30. The base 11 is preferrably of plastic such as polyethelene and the bearing 28 is preferrably of an oil impregnated sintered metal. Bayonet pins 31 on the base 11 are provided for engagement with bayonet locks 32 on the housing 12 for securement of the housing 12 to the base 11.

A mixing impeller shaft 33 is rotatably mounted in the bearing 28 and has a front thrust retainer 34 and a rear thrust retainer 35 which axially position and retain the shaft 33 in the bearing 28. The shaft 33 has a cantilevered rear distal end 36 which is flatted for being coupled to the motor 18 and a cantilevered front distal end 37 which is flatted for mounting and driving the impeller 14.

An elastomeric seal 38 has a peripheral L-shaped section 39 fluid tightly clamped between the base 11 and housing 12. At the center of the seal 38, a resilient lip seal element 40 engages the shaft 33 substantially forward of the bearing 28 and front retainer 34.

An elastomeric centrifugal slinger 41 is frictionally mounted on the shaft 33 in between the seal element 40 and the front thrust retainer 34, and within the depression section 25 and directly above the drain aperture 29. In the event of failure or leakage past the seal section 40, the slinger 41 will expel leaked fluid out of the drain aperture 29 and protect the bearing 28. Evidence of leakage will be immediately and visually apparent as the leaked fluid will drain via aperture 30 and down the front side of the chassis 20. The axis of the bearing 28 and of rotation of the shaft 33 and impeller 14 is preferably horizontal.

An important improvement in the mixer 10 is the housing 12 which includes a tubular wall 42, a front wall 43, a fluid outlet conduit 44, a fluid inlet conduit 45 and a funnel 46, all of which are integrally molded in a single part of a material such as polyethelene.

The tubular wall 42 has a cylindrical internal cross-section generally concentric to the axis of rotation of the impeller 14. A plurality of spaced apart ribs 47 in the upper half of the tubular wall 42 effect shearing turbulence to fluid in the mixing chamber 13 when the impeller 14 is rotating. The front wall 43 closes the front of the tubular wall 42 and the seal 38 has a central section 48 forming a rear or second wall closing the backside of the tubular wall 42. The space within the walls 42, 43, 48 is the mixing chamber 13.

The fluid outlet conduit 44 extends out of and through the lowest level of the tubular wall 42. The outlet conduit 44 has its center line approximately intersecting the lowest level of intersection between the tubular wall 42 and the front end wall 43. The outlet conduit 44 is sloped downwardly at a angle of twenty degrees or less and a preferred angle is ten degrees below the axis of rotation of the impeller 14. The lower portion 49 of the outlet conduit 44 intersects with the tubular wall 42 and is directly under the impeller 14. The upper portion 50 of the outlet conduit 44 intersects with and extends through the bottom of the front wall 43.

Figure 3:
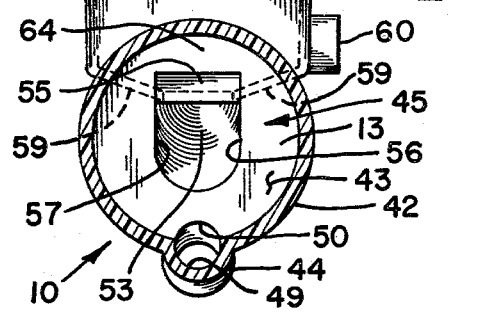
FIG. 3 is a forward looking elevational view in partial cross-section taken through lines III—III of FIG. 1.
Figure 4:
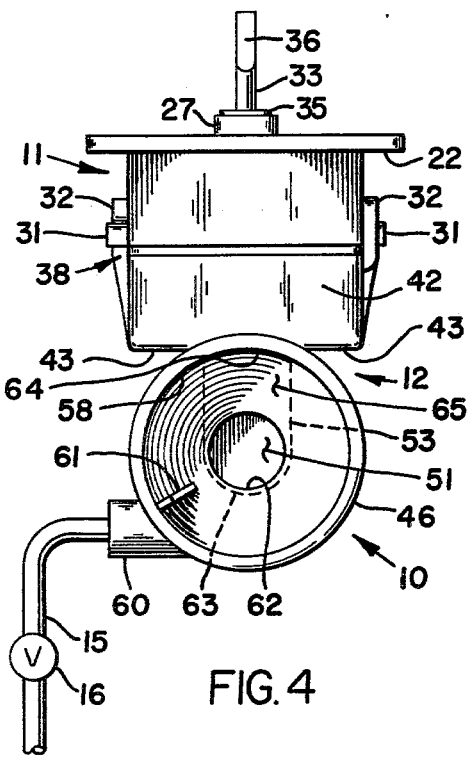
FIG. 4 is a top plan view looking down at the structure of FIG. 1.
Figure 2:
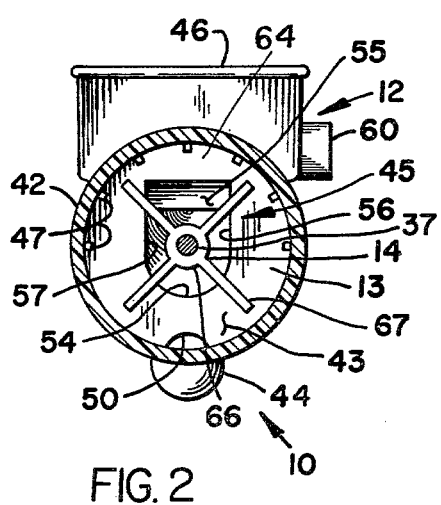
FIG. 2 is a forward looking elevational view in partial cross-section taken through lines II—II of FIG. 1.

The fluid inlet conduit 45 has an inlet end 51, an outlet end 52, and an inlet port 53 which gradually increases in internal cross-section from the inlet end 51 to the outlet end 52. The inlet end 51 has a concave spherical radius from which a port bottom 54 slopes downwardly at about twenty degrees below the axis of rotation of the impeller 14. The radius continues downward with the bottom 54 as best seen in FIG. 3 and a flat port top 55 slopes upwardly at about twenty degrees above the axis of rotation of the impeller 14 or generally at the same angle as the bottom 54. A pair of upright sides 56, 57 are generally parallel to each other and span between the bottom 54 and top 55 to define the inlet port 53. The inlet port 53 therefore expands in internal cross-section between its top 55 and bottom 54. The top 55 intersects the housing front wall 43 at a level well below the uppermost level of the tubular wall 42. The form of the inlet conduit outlet end 52 where it intersects with and through the front end wall 43 is a D- shape, as best seen in FIGS. 2 and 3, which is non-concentric or of varying radius from the axis of rotation of the impeller 14. The inlet conduit 45 is directly above the outlet conduit 44 and is positioned to empty directly over and into the outlet conduit lower portion 50, and the inlet conduit 45 and outlet conduit 44 are vertically positioned to intersect with one another at the front end wall 43. Both the inlet conduit 45 and the outlet conduit 44 extend through the front end wall 43 and extend frontward and outward in the same direction from the front end wall 43. The inlet conduit 45, while non-concentric to the axis of rotation of the impeller 14, is nevertheless positioned to feed fluid to the impeller more or less at and along its axis of rotation.

The funnel 46 is on top of the inlet conduit 45 and to the front of the mixing chamber 13. An upright wall 58 is in cylindrical form and a lower wall 59 extends downwardly in frusto-conical form from the upward wall 58. A diluent inlet 60 provides an inlet from the liquid line 15 and a barrier 61 turns swirling liquid flow into a central outlet port 62 which opens into the inlet conduit inlet end 45. The funnel oulet port 62 is smaller in size than the inlet end 51 and a concave step 63 is under the downstream side of the outlet port 62.

An important feature of the mixer 10 and the housing 11 is size compaction of the funnel 46 and inlet conduit 45 with the housing walls 42,43 that form at least part of the mixing chamber 13. The funnel 46 is integral with the front end wall 43 and is positioned to vertically overlap with and against the mixing chamber 13. A common wall portion 64 serves as part of the structure of both the funnel upright wall 58 and as part of the structure of the front end wall 43, enabling the funnel 46 to be physically close as is possible to the mixing chamber 13. Further, a wall portion 65 of the funnel lower wall 59 is common to and serves as part of the structure of both the funnel 46 and the inlet conduit 45 and this funnel lower wall portion 65 is in direct exposure to the interior of the mixing chamber 13. The inlet conduit bottom 54 and sides 56, 57 are joined to both of the front end wall 43 and the funnel 46 and also serve to rigidly support the funnel 46 generally perpendicular to the front end wall 43 and to the axis of rotation of the impeller 14.

The mixing impeller 14 has a hub 66 frictionally retained on and indexed to the shaft front distal end 37, a plurality of radial blades 67 extending from the hub 66, and a tapered leading end nose 68 which extends into the inlet conduit 45 but which is spaced laterally from and downstream of the conduit inlet end 51.

A helical auger 69 is mounted on the impeller 14 and extends into the inlet conduit 45 further than the nose 68. The helix of the auger 69 is pitched to draw fluid into the mixing chamber as the impeller 14 is rotating. The auger 69 preferably has a conical shape having an included angle of less than the a ngle between the inlet conduit top 55 and bottom 54, preferably is a wire coil spring having spaced apart coils, is snap fitted on the leading end of the impeller 14 and is frictionally indexed to the impeller 14 for co-rotation therewith.

In operation and use of the mixing device 10, the valve 16 and motors 18, 19 are concurrently energized. The impeller 14 is rotated at a speed in the range of 3000 to 3600 RPM, and concentrate and diluent are introduced into the funnel 46. The diluent washes the concentrate around the funnel 46 and into the barrier 61 which directs the diluent and concentrate into the funnel outlet port 62. The diluent and concentrate are then augered through the inlet conduit 45 and into the mixing chamber 13. Both the auger 69 and impeller nose 68 start the ingredients spinning so that 'slap' noise is reduced when the impeller blades 67 make first contact. The impeller blades 67 churn the ingredients around and through the non-concentric D-shaped outlet end 52 and then centrifugally sling the ingredient within the mixing chamber 13 and past the ribs 47. The mixed together ingredients are then centrifugally slung into the outlet conduit 44 and impacted against the outlet conduit lower portion 49 and then drained down and out of the outlet conduit 44.

The auger 69 is particularly useful when very thick concentrate such as potatoes or grits are being mixed together. For very fluid concentrates, such as chocolate and milk powders, the auger 69 is not required.

The impeller nose 68 and most of the auger 69 are down stream of the funnel outlet port 62 and within the expanding inlet port 53, there is no tendency for ingredients to be centrifugally slung back into the funnel and in fact the tapered inlet port 53 tends to force the rotating ingredients toward and into the mixing chamber 13. When the impeller 14 is rotating, it positively draws air into the funnel and expels the air downward and out of the outlet conduit 44.

The rotational speed of the impeller has been reduced to about one-third of the prior mixing devices and seal life correspondingly extended. In the event of failure of the seal element 40, the housing 12 is removed from the base 11, the impeller 14 is pulled off of the shaft 33 and the entire seal 38 is pulled from the base 11 and off of the shaft 33. A new seal 38 is then placed in service by assembling in reverse of the foregoing procedure. There is no need to remove the base 11 from the chassis 20, or to remove the shaft 33 from the base 11 or to disconnect or remove the impeller drive motor 18. When the worn-out seal 38 is replaced, the slinger 41 can also be pulled off of the shaft 33 and a cleaning towel on the end of a human finger quickly cleans the depressed section 25. During routine washing and cleaning of the mixing device 10, everything in contact with edible ingredient can be easily washed. The housing 11, impeller 14 and seal 38 can all be removed and washed and the shaft 33 can be washed in and past the area where the seal element 40 makes contact.

The mixing device can be driven either CW or CCW without distinction, save that if the auger 69 is used its helix must be of the proper direction.

For some very soluble concentrates, specifically tea and coffee, the mixing device 10 and housing 11 are most useful without the impeller 14 and shaft 33. In such construction and usage the seal 38 does not have the seal element 40 but is molded solid and imperforate. The diluent and extremely soluble concentrate then cascade by gravity out of the funnel as previously described, down the inlet conduit 45 and directly into the outlet conduit 44. There is minimal residual left in the mixing chamber 13 and completion of drain-off is very rapid due to the direct emptying of the inlet conduit 45 directly into the outlet conduit 44, either with and without the impeller 14. Again, even without the impeller 14 and shaft 33, everything in contact with the ingredients is easily washable as the alternate imperforate seal 38 also comes off with the housing 12.

After a dispensing cycle has been completed, the mixing device 10 minimizes reverse or upward flow of moist air or steam by having a resistive and tortuous path for reverse air flow and by emptying itself of diluent as efficiently as possible. The less hot diluent left in the mixing device 10 and the faster the drain off, the less steam. When steam or hot air does tend to flow upward through the mixing device 10 and toward the concentrate dispenser 17, the least dense hot air is first trapped in the top of the mixing chamber 13, then forced to go downwardly under the inlet conduit top 55 and then flow into the funnel 46 is partially obstructed by the concave step 63 which is somewhat of a partial fluid diode.

The minimal height of the mixing device 10 and housing 12 has enabled a height reduction of about two inches (50 mm) over the prior mixing device; this has provided a 50% reduction in the height of these mixing devices.

The quantity of plastic for fabrication of the housing 12 is about half of what was previously required and costs have been reduced accordingly.

The mixing device 10 is significantly quieter compared to its predecessors.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A dispensing machine mixing device for the mixing together of concentrate and diluent, comprising:
   (a) first and second end walls and a tubular wall therebetween, said walls enclosing and defining a beverage mixing chamber therewithin;
   (b) means within the mixing chamber for effecting turbulent mixing motion therein;
   (c) a funnel having an upright wall, a lower wall extending downward from the upright wall, and an outlet port through the lower wall and in fluid communication with the mixing chamber, and
   (d) a common wall portion in said mixing chamber first end wall, said common wall portion is common to and is part of said funnel upright wall, said funnel being materially integral with said first end wall and being vertically overlapped against said mixing chamber by virtue of and at said common wall portion.

2. A dispensing machine mixing device according to claim 1, in which at least part of said funnel lower wall is in direct exposure to the interior of said mixing chamber.

3. A dispensing machine mixing device according to claim 2, in which a portion of said funnel lower wall is common to both of said funnel lower wall and an inlet conduit.

4. A dispensing machine mixing device according to claim 3 in which said inlet conduit includes a pair of side walls joined to both of the mixing chamber first end wall and the funnel, for supporting the funnel from the front of the said first end wall.

5. A dispensing machine mixing device for mixing together of concentrate and diluent, comprising:
   (a) first and second end walls and a tubular wall therebetween, said walls enclosing and defining a mixing chamber therewithin;
   (b) means within the mixing chamber for effecting turbulent mixing motion therein;
   (c) an inlet conduit connected to said first end wall, said inlet conduit having
      (1) an inlet end,
      (2) an outlet end in and through the first wall and spaced from the inlet end and having a larger internal cross-section than the inlet end, and
      (3) an inlet port within the conduit and between the inlet and outlet ends, said inlet port gradually expanding in internal cross-section from the inlet end to the outlet end, with the largest internal cross-section being at the outlet end; and (d) a funnel atop of said inlet conduit, a portion of the wall of said inlet conduit extending upwardly in said conduit and commonly and structurally forming part of a downwardly sloped bottom in the funnel.

6. A dispensing machine mixing device according to claim 5, including an outlet port opening to and adjoining said conduit inlet end, said outlet port being smaller in size than said inlet end, with there being a concave step under the downstream side of said outlet port where the port adjoins the inlet end, said concave step facing downstream in said inlet port.

7. A dispensing machine mixing device according to claim 5, in which said inlet port lies along a generally horizontal axis and expands along this axis between top and bottom wall surfaces of the conduit.

8. A dispensing machine mixing device according to claim 7 in which said inlet conduit includes a pair of opposed upright sides, said sides being generally parallel to each other.

9. A dispensing machine mixing device according to either of claims 7 or 8 in which the top of said inlet conduit is substantially flat.

10. A dispensing machine mixing device according to either of claim 7 or 8 in which said inlet port top and bottom diverge from horizontal at substantially the same angle.

11. A dispensing machine mixing device according to either of claims 7 or 8 in which the top of said inlet port intersects with said mixing chamber first end wall at a level below the uppermost level of said mixing chamber tubular wall.

12. A dispensing machine mixing device according to either of claims 5 or 7, in which said turbulent mixing means comprises an impeller rotatable about a generally horizontal axis within the mixing chamber and extending into the inlet conduit, the inlet conduit and its outlet to the mixing chamber having an internal cross-section which is non-concentric to said axis of rotation, said internal cross-section being D-shaped with a flat top, rounded bottom and flatted sides.

13. A dispensing machine mixing device according to either of claims 5 or 7, in which said turbulant mixing motion means comprises an impeller rotatable about a generally horizontal axis in and extending through the mixing chamber, said impeller having a leading end nose extending into the inlet conduit while being spaced laterally from and downstream of the inlet end of the conduit; said device further including a helical auger co-rotatably mounted on to the impeller for being rotatably driven by the impeller, said auger being a cantilevered conical open coil spring extending into the inlet conduit further than the impeller nose, with the coils of conical auger defining an included angle which is less than an included angle of expansion of the inlet port.

14. A dispensing machine mixing device for the mixing together of concentrate and diluent, comprising:

(a) first and second end walls and a tubular wall therebetween, said walls defining a mixing chamber therewithin;

(b) a mixed fluid outlet conduit through and from the lowest level of the mixing chamber tubular wall; and (c) an inlet conduit into and through the first end wall and directly above said fluid outlet, said inlet conduit being directed and positioned for dumping directly into said outlet and having a top extending upwardly toward said mixing chamber.

15. A dispensing machine mixing device according to claim 14, in which the top of said inlet conduit is at a level below the uppermost level of said mixing chamber.

16. A dispensing machine mixing device for the mixing together of concentrate and diluent, comprising:

(a) first and second end walls and a tubular wall therebetween, said walls defining a mixing chamber therewithin;

(b) a mixing impeller within said chamber, said impeller being rotatable about a generally horizontal axis which is generally perpendicular to said end walls;

(c) a mixed fluid outlet conduit having a lower portion directly under said impeller and extending through and from the lowest level of the mixing chamber tubular wall, and an upper portion common to the lower portion and extending through the bottom of the first end wall, said mixed fluid outlet conduit extending outwardly from said device in a direction forward of and from said first end wall at and on a downward slope within twenty degrees of the axis of rotation of said impeller; and (d) an inlet conduit into and through the first said wall directly above said fluid outlet conduit, said inlet conduit being
  (1) directed and positioned for dumping directly into said outlet conduit,
  (2) extended outwardly from said device in a direction forward of and from the first end wall, and directly above the outlet conduit, and
  (3) intersecting with the outlet conduit at the first end wall.

17. A dispensing machine mixing device for the mixing together of concentrate and diluent, comprising:

(a) first and second end walls and a tubular wall therebetween, said walls defining a mixing chamber therewithin;

(b) a mixing impeller within said mixing chamber, said impeller being rotatable about an axis generally perpendicular to said end walls;

(c) an inlet conduit extending through said first end wall to said mixing chamber; and (d) a helical auger extending from said impeller and into said inlet conduit, said auger being co-rotatable with the impeller for drawing fluid to the mixing chamber, said auger being snap fitted on and to said impeller.

18. A dispensing machine mixing device housing for the mixing together of concentrate and diluent, comprising:

(a) a front end wall and a tubular wall extending to the rear of and from said end wall, said walls being closable by a rear end wall for forming a beverage mixing chamber within said walls;

(b) a funnel materially integral with said front and tubular walls, said funnel having an upright wall, a lower wall extending downward from the upright wall, and an outlet port through the lower wall;

(c) an inlet port from the funnel outlet port and extending into and through the front end wall; and (d) a common portion in said front end wall, said common portion being common to and being a part of said funnel upright wall, said funnel being vertically overlapped with and against said front end wall, with one side of the common portion being an inner surface in the funnel and a second side of the common portion being an inner surface on the front end wall and a surface of the mixing chamber.

19. A housing according to claim 18, in which said outlet port is positioned centrally in said funnel lower wall, and in which said inlet port is part of an inlet conduit extending from the outlet port to the front end wall, with there being a discrete portion of said funnel lower wall materially common to and a part of both said lower funnel lower wall and said inlet conduit, said discrete portion having an upper side being a surface in the funnel and a lower side being a surface in the inlet conduit.

20. A dispensing machine mixing device housing for the mixing together of beverage concentrate and diluent, comprising:

(a) a front end wall and a tubular wall extending to the rear of and from said end wall, said walls being closable by a rear end wall for forming a beverage mixing chamber;

(b) a funnel integral with said front end wall and tubular walls and positioned generally perpendicular to said front end wall;

(c) an inlet conduit fluidly connecting said funnel to and through said front end wall, said conduit having
  (1) an inlet end,
  (2) an outlet end of larger internal cross-section than the inlet end, and
  (3) an inlet port between the inlet and outlet ends, said inlet port having an upwardly extending top, a bottom, and an internal cross-section expanding between the top and the bottom from the inlet end to the outlet end, and (d) an intersection between the top of said inlet port with the front end wall, said intersection being spaced inwardly of the tubular wall.

* * * * *